United States Patent
Polo et al.

(10) Patent No.: US 9,483,876 B2
(45) Date of Patent: *Nov. 1, 2016

(54) AUGMENTATION OF ELEMENTS IN A DATA CONTENT

(71) Applicant: Sphero, Inc., Boulder, CO (US)

(72) Inventors: Fabrizio Polo, Boulder, CO (US); Skylar Castator-Smith, Boulder, CO (US); Adam Wilson, Longmont, CO (US); Brian Smith, Longmont, CO (US); Patrick Martin, Arvada, CO (US); Brandon Dorris, Erie, CO (US)

(73) Assignee: Sphero, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/017,211

(22) Filed: Feb. 5, 2016

(65) Prior Publication Data

US 2016/0155272 A1 Jun. 2, 2016

Related U.S. Application Data

(63) Continuation of application No. 14/148,541, filed on Jan. 6, 2014, now Pat. No. 9,292,758, which is a continuation-in-part of application No. 13/894,247, filed on May 14, 2013, now Pat. No. 9,280,717, and (Continued)

(51) Int. Cl.
*G06K 9/00* (2006.01)
*G06T 19/00* (2011.01)
*G06F 3/041* (2006.01)

(52) U.S. Cl.
CPC .............. *G06T 19/006* (2013.01); *G06F 3/041* (2013.01)

(58) Field of Classification Search
CPC . G06T 19/006; G06T 19/00; G06K 9/00671; G06K 9/46
USPC ........................................................ 382/103
See application file for complete search history.

(56) References Cited

U.S. PATENT DOCUMENTS

| 3,683,216 A | 8/1972 | Post |
| 4,996,468 A | 2/1991 | Field et al. |

(Continued)

FOREIGN PATENT DOCUMENTS

| DE | 101 46 862 A1 | 5/2002 |
| JP | 03182290 A | 8/1991 |

(Continued)

OTHER PUBLICATIONS

U.S. Appl. No. 61/362,005, filed Jul. 7, 2010, Schmelzer, Richard.

(Continued)

*Primary Examiner* — Stephen R Koziol
*Assistant Examiner* — Shaghayegh Azima
(74) *Attorney, Agent, or Firm* — Mahamedi IP Law LLP (57) ABSTRACT

A computing device can augment video content by receiving video content from an image capturing device and detecting and tracking a self-propelled device in the video content. The computing device can display a plurality of augmented reality elements selectable to augment the self-propelled device and receive a user selection of one of the plurality of augmented reality elements to augment the self-propelled device. The computing device may then augment the self-propelled device in the video content by superimposing the selected augmented reality element over the self-propelled device as the self-propelled device moves.

20 Claims, 4 Drawing Sheets

Related U.S. Application Data a continuation-in-part of application No. 14/054,636, filed on Oct. 15, 2013.

(60) Provisional application No. 61/646,716, filed on May 14, 2012.

(56) References Cited

U.S. PATENT DOCUMENTS

| | | |
|---|---|---|
| 5,297,981 A | 3/1994 | Maxim et al. |
| 5,342,051 A | 8/1994 | Rankin et al. |
| 5,413,345 A | 5/1995 | Nauck |
| 5,489,099 A | 2/1996 | Rankin et al. |
| 5,513,854 A | 5/1996 | Daver |
| 5,644,139 A | 7/1997 | Allen et al. |
| 5,780,826 A | 7/1998 | Hareyama et al. |
| 5,953,056 A | 9/1999 | Tucker |
| 6,227,933 B1 | 5/2001 | Michaud et al. |
| 6,246,927 B1 | 6/2001 | Dratman |
| 6,449,010 B1 | 9/2002 | Tucker |
| 6,456,938 B1 | 9/2002 | Barnard |
| 6,458,008 B1 | 10/2002 | Hyneman |
| 6,459,955 B1 | 10/2002 | Bartsch et al. |
| 6,573,883 B1 | 6/2003 | Bartlett |
| 6,615,109 B1 | 9/2003 | Matsuoka et al. |
| 6,764,373 B1 | 7/2004 | Osawa et al. |
| 6,785,590 B2 | 8/2004 | Kasuga et al. |
| 6,856,696 B1 | 2/2005 | Ajioka |
| 6,901,110 B1 | 5/2005 | Tsougarakis et al. |
| 6,945,843 B1 | 9/2005 | Motosko |
| 6,980,956 B1 | 12/2005 | Takagi et al. |
| 7,058,205 B2 | 6/2006 | Jepson et al. |
| 7,069,113 B2 | 6/2006 | Matsuoka et al. |
| 7,170,047 B2 | 1/2007 | Pal |
| 7,173,604 B2 | 2/2007 | Marvit et al. |
| 7,258,591 B2 | 8/2007 | Xu et al. |
| 7,283,647 B2 | 10/2007 | McNitt |
| 7,292,711 B2 | 11/2007 | Kiraly et al. |
| 7,324,663 B2 | 1/2008 | Kiraly |
| 7,328,671 B2 | 2/2008 | Kates |
| 7,340,077 B2 | 3/2008 | Gokturk et al. |
| 7,340,344 B2 | 3/2008 | Chappell |
| 7,344,430 B2 | 3/2008 | Hasty et al. |
| 7,409,924 B2 | 8/2008 | Kates |
| 7,424,867 B2 | 9/2008 | Kates |
| 7,432,718 B2 | 10/2008 | Ishihara et al. |
| 7,526,362 B2 | 4/2009 | Kim et al. |
| 7,542,597 B2 | 6/2009 | Rahn et al. |
| 7,639,874 B2 | 12/2009 | Bushell et al. |
| 7,699,683 B2 * | 4/2010 | Caspi ............... F41A 23/34 124/71 |
| 7,702,131 B2 | 4/2010 | Chinen et al. |
| 7,714,880 B2 | 5/2010 | Johnson |
| 7,755,660 B2 | 7/2010 | Nejikovsky et al. |
| 7,822,507 B2 | 10/2010 | Ishihara et al. |
| 7,847,504 B2 | 12/2010 | Hollis |
| 7,853,357 B2 | 12/2010 | Sawada et al. |
| 7,899,226 B2 * | 3/2011 | Pescatore .......... A61B 90/36 378/4 |
| 7,979,162 B2 | 7/2011 | Niemela et al. |
| 8,025,551 B2 | 9/2011 | Torres et al. |
| 8,038,504 B1 | 10/2011 | Wong |
| 8,077,981 B2 | 12/2011 | Elangovan et al. |
| 8,099,189 B2 | 1/2012 | Kaznov et al. |
| 8,128,450 B2 | 3/2012 | Imai |
| 8,128,500 B1 | 3/2012 | Borst et al. |
| 8,142,287 B2 | 3/2012 | Podoloff |
| 8,144,118 B2 | 3/2012 | Hildreth |
| 8,180,436 B2 | 5/2012 | Boyden et al. |
| 8,197,298 B2 | 6/2012 | Willett |
| 8,258,917 B2 | 9/2012 | Cai et al. |
| 8,274,406 B2 | 9/2012 | Karlsson et al. |
| 8,275,544 B1 | 9/2012 | Wells et al. |
| 8,326,469 B2 | 12/2012 | Phillips et al. |
| 8,352,643 B2 | 1/2013 | Birnbaum et al. |
| 8,355,818 B2 | 1/2013 | Nielsen et al. |
| 8,364,136 B2 | 1/2013 | Hoffberg et al. |
| 8,392,065 B2 | 3/2013 | Tolstedt et al. |
| 8,396,611 B2 | 3/2013 | Phillips et al. |
| 8,400,619 B1 | 3/2013 | Bachrach et al. |
| 8,417,384 B2 | 4/2013 | Togawa et al. |
| 8,456,298 B2 | 6/2013 | Valtonen |
| 8,571,781 B2 | 10/2013 | Bernstein et al. |
| 8,577,595 B2 | 11/2013 | Zhao et al. |
| 8,670,889 B2 | 3/2014 | Kaznov |
| 8,751,063 B2 | 6/2014 | Bernstein et al. |
| 8,766,983 B2 * | 7/2014 | Marks ............... A63F 13/06 345/419 |
| 8,885,882 B1 | 11/2014 | Yin et al. |
| 2003/0093182 A1 | 5/2003 | Yokoyama |
| 2004/0002843 A1 | 1/2004 | Robarts et al. |
| 2004/0182614 A1 | 9/2004 | Wakui |
| 2004/0186623 A1 | 9/2004 | Dooley et al. |
| 2005/0186884 A1 | 8/2005 | Evans |
| 2005/0226192 A1 | 10/2005 | Red et al. |
| 2005/0264472 A1 | 12/2005 | Rast |
| 2006/0080802 A1 | 4/2006 | Tani |
| 2006/0095158 A1 | 5/2006 | Lee et al. |
| 2006/0101465 A1 | 5/2006 | Kato et al. |
| 2006/0132318 A1 | 6/2006 | Shimizu |
| 2006/0271251 A1 | 11/2006 | Hopkins |
| 2007/0112462 A1 | 5/2007 | Kim et al. |
| 2007/0249422 A1 | 10/2007 | Podoloff |
| 2007/0259592 A1 | 11/2007 | Imai et al. |
| 2008/0033641 A1 | 2/2008 | Medalia |
| 2008/0240507 A1 | 10/2008 | Niwa et al. |
| 2008/0263628 A1 | 10/2008 | Norman et al. |
| 2008/0267450 A1 | 10/2008 | Sugimoto et al. |
| 2008/0269949 A1 | 10/2008 | Norman et al. |
| 2009/0055019 A1 | 2/2009 | Stiehl et al. |
| 2009/0057238 A1 | 3/2009 | Garti |
| 2009/0081923 A1 | 3/2009 | Dooley et al. |
| 2009/0204261 A1 | 8/2009 | Strand et al. |
| 2009/0226035 A1 * | 9/2009 | Iihoshi ............... G06K 9/00234 382/103 |
| 2009/0262074 A1 | 10/2009 | Nasiri et al. |
| 2009/0284553 A1 * | 11/2009 | Seydoux ............ A63F 13/10 345/649 |
| 2009/0316012 A1 | 12/2009 | Matos |
| 2010/0002909 A1 * | 1/2010 | Lefevre ............ G06F 3/04815 382/103 |
| 2010/0010669 A1 | 1/2010 | Lee et al. |
| 2010/0032224 A1 | 2/2010 | Liu |
| 2010/0063652 A1 | 3/2010 | Anderson |
| 2010/0066676 A1 | 3/2010 | Kramer et al. |
| 2010/0106344 A1 | 4/2010 | Edwards et al. |
| 2010/0145236 A1 | 6/2010 | Greenberg et al. |
| 2010/0169098 A1 | 7/2010 | Patch |
| 2010/0172287 A1 | 7/2010 | Krieter |
| 2010/0178982 A1 | 7/2010 | Ehrman |
| 2010/0183195 A1 | 7/2010 | Sharma |
| 2010/0234993 A1 | 9/2010 | Seelinger et al. |
| 2010/0241289 A1 | 9/2010 | Sandberg |
| 2010/0261526 A1 | 10/2010 | Anderson et al. |
| 2010/0283988 A1 | 11/2010 | Mosier et al. |
| 2010/0305778 A1 | 12/2010 | Dorneich et al. |
| 2010/0305781 A1 | 12/2010 | Felix |
| 2010/0324753 A1 | 12/2010 | Okumatsu |
| 2011/0003640 A9 | 1/2011 | Ehrman |
| 2011/0018731 A1 | 1/2011 | Linsky et al. |
| 2011/0018794 A1 | 1/2011 | Linsky et al. |
| 2011/0022196 A1 | 1/2011 | Linsky et al. |
| 2011/0050940 A1 | 3/2011 | Lanz et al. |
| 2011/0060492 A1 | 3/2011 | Kaznov |
| 2011/0065488 A1 | 3/2011 | Okamura et al. |
| 2011/0071652 A1 | 3/2011 | Brown et al. |
| 2011/0071702 A1 | 3/2011 | Wang et al. |
| 2011/0082566 A1 | 4/2011 | Herr et al. |
| 2011/0087371 A1 | 4/2011 | Sandberg et al. |
| 2011/0138416 A1 * | 6/2011 | Kang ............... G06F 3/0482 725/39 |
| 2011/0183732 A1 * | 7/2011 | Block ............... G06Q 30/02 463/1 |
| 2011/0184590 A1 | 7/2011 | Duggan et al. |

(56) References Cited

U.S. PATENT DOCUMENTS

| | | |
|---|---|---|
| 2011/0201362 A1* | 8/2011 | Bregman-Amitai .. G06T 19/006 455/466 |
| 2011/0213278 A1 | 9/2011 | Horak et al. |
| 2011/0234488 A1 | 9/2011 | Ge et al. |
| 2011/0237324 A1* | 9/2011 | Clavin ............... G06K 9/00369 463/29 |
| 2011/0249074 A1* | 10/2011 | Cranfill .................. H04N 7/147 348/14.02 |
| 2011/0250967 A1 | 10/2011 | Kulas |
| 2011/0283223 A1* | 11/2011 | Vaittinen ............ G01C 21/3647 715/781 |
| 2011/0286631 A1 | 11/2011 | Wagner et al. |
| 2011/0291926 A1 | 12/2011 | Gokturk et al. |
| 2011/0313568 A1 | 12/2011 | Blackwell et al. |
| 2011/0320830 A1 | 12/2011 | Ito |
| 2012/0009845 A1 | 1/2012 | Schmelzer |
| 2012/0035799 A1 | 2/2012 | Ehrmann |
| 2012/0065747 A1 | 3/2012 | Brown et al. |
| 2012/0083945 A1 | 4/2012 | Oakley et al. |
| 2012/0099756 A1* | 4/2012 | Sherman .............. G07G 1/0063 382/100 |
| 2012/0100915 A1* | 4/2012 | Margalit ................. A63F 13/10 463/31 |
| 2012/0106783 A1 | 5/2012 | Chang et al. |
| 2012/0146775 A1 | 6/2012 | Kudo et al. |
| 2012/0167014 A1 | 6/2012 | Joo et al. |
| 2012/0168241 A1* | 7/2012 | Bernstein ............... A63H 30/04 180/167 |
| 2012/0173018 A1 | 7/2012 | Allen et al. |
| 2012/0173047 A1 | 7/2012 | Bernstein et al. |
| 2012/0173049 A1 | 7/2012 | Bernstein et al. |
| 2012/0185115 A1 | 7/2012 | Dean |
| 2012/0193154 A1 | 8/2012 | Wellborn et al. |
| 2012/0197439 A1 | 8/2012 | Wang et al. |
| 2012/0215355 A1 | 8/2012 | Bewley et al. |
| 2012/0229647 A1* | 9/2012 | Calman ................. G08B 21/24 348/158 |
| 2012/0232977 A1* | 9/2012 | Calman .............. G06Q 30/0251 705/14.25 |
| 2012/0233015 A1* | 9/2012 | Calman .............. G06Q 30/0633 705/26.8 |
| 2012/0240077 A1* | 9/2012 | Vaittinen ............. G06F 3/04815 715/781 |
| 2012/0263154 A1* | 10/2012 | Blanchflower ... G06F 17/30247 370/338 |
| 2012/0291926 A1 | 11/2012 | Misra et al. |
| 2012/0293548 A1* | 11/2012 | Perez ................... G06T 19/006 345/633 |
| 2012/0298049 A1 | 11/2012 | Cook et al. |
| 2012/0298430 A1 | 11/2012 | Schroll et al. |
| 2012/0307001 A1 | 12/2012 | Osako et al. |
| 2012/0311810 A1 | 12/2012 | Gilbert et al. |
| 2013/0022274 A1* | 1/2013 | Lawrence Ashok Inigo ..................... G06T 7/0044 382/195 |
| 2013/0050069 A1 | 2/2013 | Ota |
| 2013/0065482 A1 | 3/2013 | Trickett |
| 2013/0109272 A1 | 5/2013 | Rindlisbacher |
| 2013/0143482 A1 | 6/2013 | Regier |
| 2013/0173089 A1 | 7/2013 | Bernstein et al. |
| 2013/0293584 A1* | 11/2013 | Anderson ............... G06T 11/00 345/633 |
| 2013/0307875 A1* | 11/2013 | Anderson ............. G06T 19/006 345/633 |
| 2014/0120887 A1* | 5/2014 | Huang .................. H04W 4/043 455/414.1 |

FOREIGN PATENT DOCUMENTS

| | | |
|---|---|---|
| JP | 09254838 A | 9/1997 |
| JP | 2000218578 A | 8/2000 |
| JP | 2008-040725 A | 2/2008 |
| KR | 10-2008-0073626 | 8/2008 |
| KR | 10-2009-0000013 | 1/2009 |
| KR | 10-2008-0092595 | 7/2010 |
| KR | 10-0969873 B1 | 7/2010 |
| KR | 10-2008-040725 A | 5/2011 |
| WO | WO-97/25239 A1 | 7/1997 |
| WO | WO-2006/049559 A1 | 5/2006 |
| WO | WO-2012/094349 A2 | 7/2012 |

OTHER PUBLICATIONS

International Search Report and the Written Opinion of the International Searching Authority mailed Dec. 3, 2012, for related PCT Application No. PCT/US2012/020115 filed Jan. 3, 2012, 11 pages.

Koshiyama et al., Machine Translation for JP 2000-218578, Aug. 8, 2000, 11 Pages.

GearBox Ball Prototype Jun. 29, 2010, Pictures from Video [online]. Orbotix, Inc., Jun. 30, 2010, 91 pages. Retrieved from the internet:<URL: http://www.youtube.com/watch?v=qRBM7bAaXpU>.

International Search Report and the Written Opinion of the International Searching Authority mailed Aug. 28, 2013, for related PCT Application No. PCT/US2013/041023 filed May 14, 2013, 11 pages.

Liu, Dalian et al., "Motion Control of a Spherical Mobile Robot by Feedback Linearization," 7th WC on IC&A, Jun. 27, 2008, Chongqing, China, pp. 965-970. 6 pages.

Shu, Guanghui et al., "Motion Control of Spherical Robot Based on Conservation of Angular Momentum," IEEE Intl Conf on Mechatronics & Automation, Aug. 9, 2012, Changchun, China, pp. 599-604. 6 pages.

Joshi, Vrunda et al., "Design, modeling and controllability of a spherical mobile robot", 13th Natl Conf on Mechanisms & Machines (NaCoMM07) IISc, Bangalore, India, Dec. 13, 2007, pp. 1-6.

Harmo, Panu et al., "Moving Eye-Interactive Telepresence over Internet with a Ball Shaped Mobile Robot," Automation Tech Lab, Finland, Oct. 2, 2001. 6 pages. http://automation.tkk.fi/files/tervetaas/MovingEye4.pdf.

Halme, Aarne, et al., "Motion Control of a Spherical Mobile Robot", Helsinki, IEEE AMC '1996, pp. 259-264. 6 pages.

European Search Report and European Search Opinion mailed Nov. 6, 2014, for related EP Application No. 12731945.7 filed Jul. 26, 2013. 7 pages.

International Search Report and the Written Opinion mailed Dec. 17, 214, for Application No. PCT/US2014/059973 filed Sep. 10, 2014, 13 pages.

Hashimoto et al, Nov. 2011, "TouchMe: An Augmented Reality Based Remote Robot Manipulation" (pp. 61-66).

Airioui et al., 2011 AACC Publication, "Force Feedback Stabilization for Remote Control of an Assistive Mobile Robot" (pp. 4898-4903).

Osorio et al., 2010 IDMME Publication, "Mobile Robots Design and Implementation: From Virtual Simulation to Real Robots" (pp. 1-6).

Simsarian et al., 1996 Publication, "Achieving virtual presence with a semi-autonomous robot through a multi-reality and speech control interface" (pp. 50-63).

Diolaiti et al., 2002 IEEE Publication, "Tele-operation of a Mobile Robot Through Haptic Feedback" (pp. 1-6).

\* cited by examiner

AUGMENTATION OF ELEMENTS IN A DATA CONTENT

RELATED APPLICATION

This application is a continuation application of U.S. application Ser. No. 14/148,541, filed Jan. 6, 2014, entitled "AUGMENTATION OF ELEMENTS IN DATA CONTENT," which is a continuation-in-part of U.S. application Ser. No. 14/054,636, filed Oct. 15, 2013, entitled "INTERACTIVE AUGMENTED REALITY USING A SELF-PROPELLED DEVICE," which is a continuation-in-part of U.S. application Ser. No. 13/894,247, filed May 14, 2013, entitled "OPERATING A COMPUTING DEVICE BY DETECTING ROUNDED OBJECTS IN AN IMAGE", which claims priority to U.S. Provisional Patent Application Ser. No. 61/646,716, filed May 14, 2012, entitled "OPERATING A COMPUTING DEVICE BY DETECTING ROUNDED OBJECTS IN AN IMAGE"; the aforementioned applications being hereby incorporated by reference in their respective entireties.

BACKGROUND

Augmented reality implements computer technology to optically enhance, replace, or otherwise change real-word objects in a captured video. Furthermore, computer technology has allowed for various forms of image-based object detection and recognition.

BRIEF DESCRIPTION OF THE DRAWINGS

The disclosure herein is illustrated by way of example, and not by way of limitation, in the figures of the accompanying drawings and in which like reference numerals refer to similar elements, and in which.

DETAILED DESCRIPTION

A method of processing data content is disclosed. The method includes receiving data content that includes a captured scene or an observed environment with a recognized object in the scene. The recognized object can be detected and tracked over a duration of the captured data content. Furthermore, the data content is stored, including metadata associated with one or more elements of the data content. These one or more elements can include certain characteristics of the recognized object (e.g., a shape of the object, an audio feature, other visual features, and/or data transmitted from the object).

In variations, user inputs can be processed to augment the one or more elements of the stored data content. In response to processing the inputs, the method includes augmenting the data content by introducing one or more augmented elements into the data content based on the user inputs. These one or more augmented elements can correspond to respective one or more elements of the stored data content. Furthermore, the augmented data content can then be outputted on a display of the user's computing device.

Further still, the method can include enabling real-time virtual augmentation of the one or more elements of the data content. In such, variations, the augmented content can be outputted in real time, and include the augmented elements. The outputted augmented data can include augmented visual, audio, and/or virtual representations of the recognized object. Accordingly, a set of virtual characters or representations may be provided to the user for selection to represent the recognized object in real time. The recognized object can further output data corresponding to specific characteristics of the recognized object. The outputted data can be associated with metadata corresponding to the characteristics of the recognized object.

A computing device may be provided to implement the method, and execute logic to detect and one or more objects in an observed environment. The computing device implements a graphic user interface to enable a user to augment the data content, including the detected objects, in real-time. Furthermore, the captured data content can be stored and various elements of the data content can be augmented and/or edited post-capture by the user.

Augmentation of the data content can be performed programmatically via user input by overwriting metadata captured, created, and/or stored during capture of the data content. For example, metadata associated with the tracked object, audio data, and various visual elements of the data content is stored and associated with various augmented reality elements that can ultimately be utilized by a user to produce augmented data content based on the captured data content.

One or more images, including frames of real-time video and/or other data content, are received from an capturing component of the computing device. The computing device can operate one or more applications or operate in one or more modes that use the components of the capturing component in order to receive the data content. The data content can be of a scene and/or objects in the scene in which the lens of the capturing component is focused or pointed towards. For example, the scene can include an object of interest that is in motion.

The computing device receives data content as a plurality of images in order to detect and track one or more recognizable objects (corresponding to one or more objects of interest) in one or more of the images. A recognizable object that depicted in an image, for example, can correspond to an object having at least a housing or structure with a rounded shape or a partial rounded shape, such as an ellipse, oval, disc, sphere, etc. The one or more recognizable objects can correspond to, for example, a ball, a circular object, a cylindrical object, a ready-recognizable household object, a self-propelled device having a particularly recognizable housing, an object of nature, a man-made structure or vehicle, etc., that is included within the scene (e.g., data content detected by the capturing component). In some examples, a self-propelled device can be modified (e.g., post assembly) to include a rounded, spherical, or cylindrical aspect (e.g., attach a rounded object to the self-propelled device or drop a ping pong ball in a truck bed of a remote controlled truck). The computing device can process and utilize the recognized objects in the images as inputs for performing one or more operations or processes on the computing device, such as for visual augmentation or enhancement.

Received images of the captured data content can be individually processed in order to detect the one or more objects. The computing device can use one or more detection techniques, together or individually, in order to detect the object(s). These detection techniques can include using an image filter and/or a detection algorithm based on a size or shape of the object. In addition, the detection techniques can be used to determine position information for one or more of the recognized objects based on a relative position of object(s) in the one or more images. Detecting the object(s) in the images can also enable the computing device to track the movement of the object(s), as well as a velocity and/or acceleration.

Upon detecting one or more recognizable objects in the received images, the computing device can utilize the detected objects and the respective position information as inputs for performing additional operations or processes. For example, the computing device can adjust or augment the images that include the detected objects in real time, and present the adjusted images on a display of the computing device. In such examples, a user of the computing device may be presented a user interface for augmenting one or more of the detected objects, including superposition of virtual characters and altering aspects of sound and/or visual characteristics of the captured data content.

The capturing component can be distinct and separate from the computing device that detects the one or more objects in the captured data content. The capturing component and the computing device can wirelessly communicate with each other in order to enable the computing device to receive the one or more images from the capturing component. A recording device, such as a video capturing device, can also be separate from and wirelessly communicate with the computing device. In other embodiments, the devices can be a part of or be incorporated together as one device.

Embodiments described herein also provide for the operations and/or processes that are performed by the recording device and/or the capturing component and/or the computing device to be performed at different times and different orders (e.g., shifted temporally).

One or more embodiments described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more embodiments described herein can be implemented using programmatic modules or components of a system. A programmatic module or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some embodiments described herein can generally require the use of computing devices, including processing and memory resources. For example, one or more embodiments described herein may be implemented, in whole or in part, on computing devices such as digital cameras, digital camcorders, desktop computers, cellular or smart phones, personal digital assistants (PDAs), laptop computers, printers, digital picture frames, and tablet devices. Memory, processing, and network resources may all be used in connection with the establishment, use, or performance of any embodiment described herein (including with the performance of any method or with the implementation of any system).

Furthermore, one or more embodiments described herein may be implemented through the use of instructions that are executable by one or more processors. These instructions may be carried on a computer-readable medium non-transitory in nature. Machines shown or described with figures below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smart phones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, embodiments may be implemented in the form of computer-programs, or a computer usable carrier medium capable of carrying such a program.

Hardware Diagram

Figure 1:
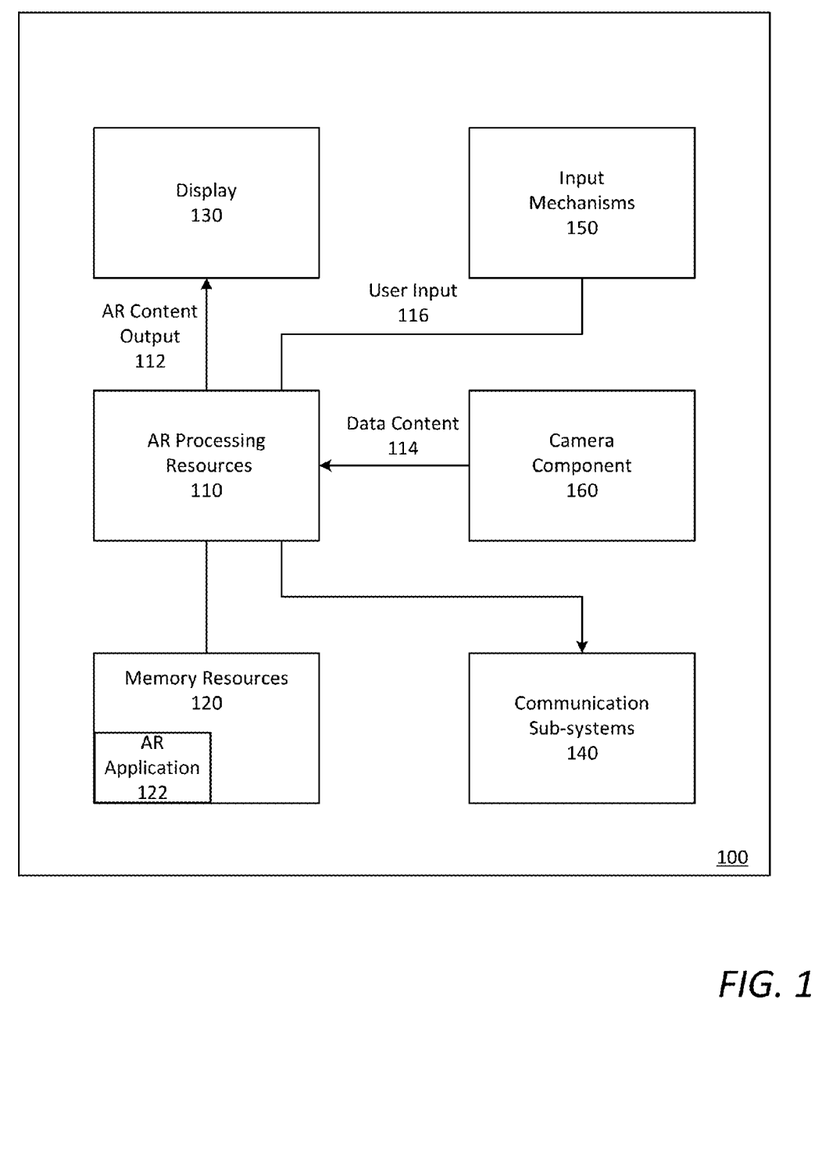
FIG. 1 illustrates an example system allowing for data content capture and display.

FIG. 1 illustrates an example hardware diagram of a computer system upon which examples described herein can be implemented. A computing device 100 corresponds to a mobile computing device, such as a cellular device that is capable of telephony, messaging, and data services. Examples of such devices include smart phones, handsets or tablet devices for cellular carriers, digital cameras, or laptops and desktops (e.g., PC). Computing device 100 includes processing resources (e.g., one or more processors for augmenting data content) 110, memory resources 120, a display 130, one or more communication sub-systems 140 (including wireless communication sub-systems), input mechanisms 150, and camera components 160. The display 130 can be a touch-sensitive display that can also receive input from a user. One or more of the communication sub-systems 140 can send and receive cellular data over data channels and voice channels.

The augmented reality (AR) processing resources 110 can be configured with software and/or other logic to perform one or more processes, steps, and other functions described below. The processing resources 110 can be configured, with instructions and data stored in the memory resources 120, to implement the system 100. For example, instructions for implementing object detection, augmentation logic, metadata overwrite, a graphic user interface, and device control can be stored in the memory resources 120 of the computing device 100.

Additionally or as an alternative, the processing resources 110 are configured to execute instructions for operating object detection and for receiving images or data content 114 that have been captured by the lens and/or other components 160 of the capturing component. After detecting one or more objects or elements in one or more images, the processing resources 110 can execute instructions for causing AR content output 112 to be presented on the display 130. Such AR content output 112 can be augmented according to user inputs 116 and adjustments in real-time or during post-processing or post-capture of the data content 114. The processing resources 110 can also execute instructions based on the user inputs 116 from a remote device via the communication sub-systems 140.

The processing resources 110 can be configured to execute and operate a variety of different applications and/or functionalities, such as, for example, a home page or start screen, an application launcher page, messaging applications (e.g., SMS messaging application, e-mail application, IM application), a phone application, game applications, calendar application, document application, web browser application, clock application, camera application, media viewing application (e.g., for videos, images, audio), social media applications, financial applications, and device settings.

For example, an executed application (e.g., AR application 122) on the computing device 100 can be specific to remotely controlling a self-propelled device, which can correspond to the recognized object in the data content 114. The AR application 122 can enable the user of the computing device 100 to augment the data content 114 in real-time and/or record the data content including the self-propelled device for storage and future editing. The same application 122, or a separate application specific to augmenting data content, can be executed to enable the user to edit the data content 114, including augmenting one or more elements of the data content 114, as described in detail below.

System Description

Figure 2:
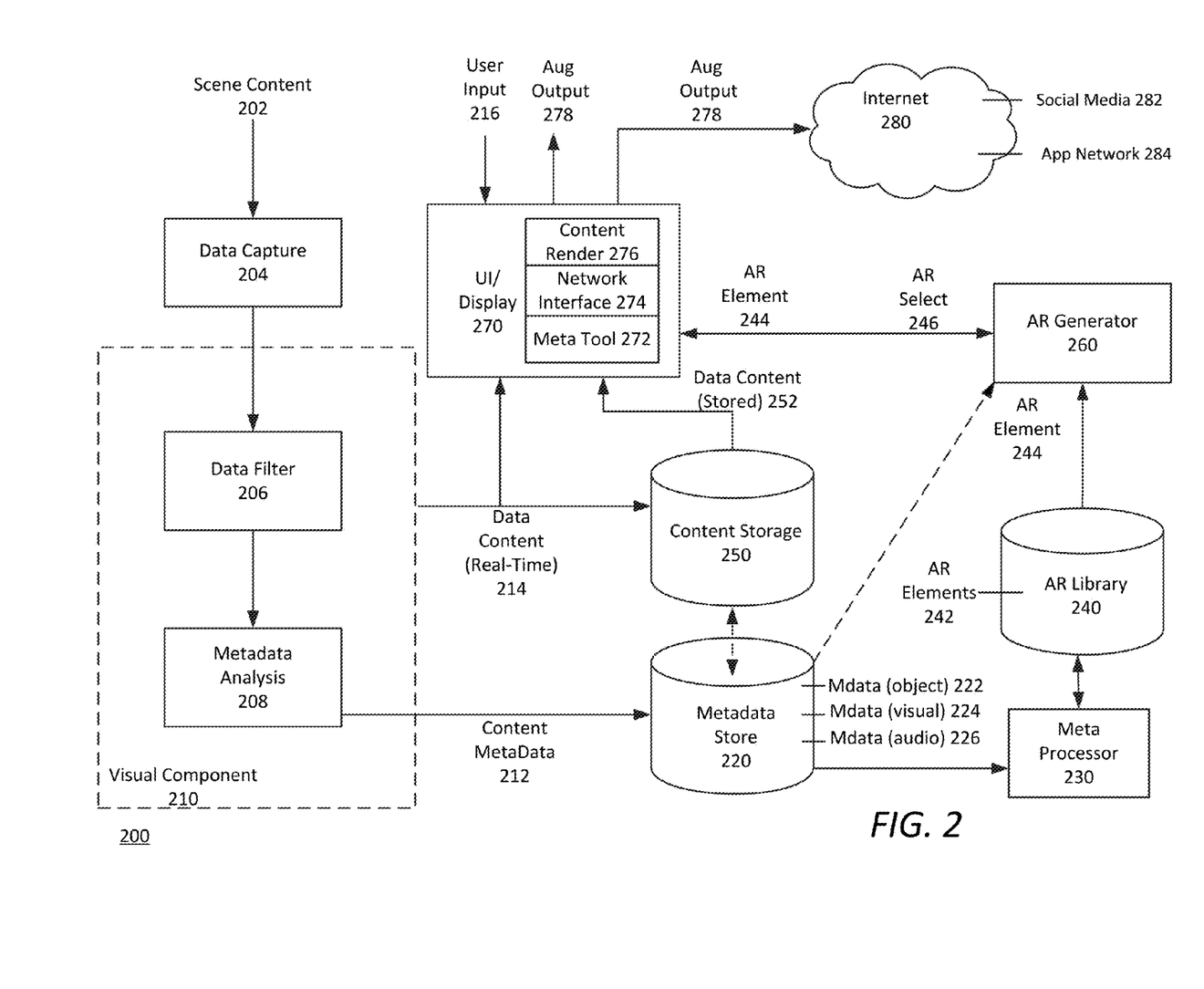
FIG. 2 illustrates a system and resources to enable real-time and/or post-capture visual/audio augmentation of data content including a recognized object.

FIG. 2 illustrates a system and resources to enable real-time and/or post-capture visual/audio augmentation of data content including a recognized object. Various features described with respect to FIG. 2 can be implemented and/or utilized via the computing device 100 of FIG. 1. Furthermore, components and features described with respect to FIG. 2 can be configured for execution in conjunction with or as an alternative to features of FIG. 1. For example, the visual component 210 of FIG. 2 is integrated within the computing device 100 of FIG. 1, or alternatively, outsourced as a separate component of, for example, a server or data processing entity. Similarly, the content storage 250 and the data capture component 204 of FIG. 2 can be integrated in the computing device 100 of FIG. 1, or provided as separate components of the system. Along these lines, various components illustrated in FIG. 2 can either be integrated as a part of the computing device 100 as a whole, or provided as external components of the system 200.

Referring to FIG. 2, a system 200 is illustrated in which scene content 202 is captured or otherwise delivered to a data capture component 204. The data capture component 204 can run the scene content 202 through a visual component 210, which can include a data filter 206 and a metadata analysis component 208. The data capture component 204 may be a camera provided on a computing device 100. Alternatively, the data capture component 204 may be part of an interface to an external processing resource provided in the system 200.

The visual component 210 can have an input corresponding to the scene content 202 captured by or delivered through the data capture component 204. Furthermore, the visual component 210 can output data content 214 corresponding to real-time displayed content or captured data content for storage in a content storage 250. Additionally, the visual component 210 can include a data filter 206 and a metadata analysis component 208 to parse the scene content 202 into recognized objects or elements and create and/or organize metadata associated with those recognized objects or elements. Thus, another output of the visual component 210 is content metadata 212 associated with the recognized objects or elements in the scene content 202.

The data filter 206 can implement an algorithm configured to distinguish and recognize one or more elements of the scene content 202 in order to produce filtered content. For example, the processed algorithm can be configured to recognize one or more certain objects in the scene content 202, such as rounded or cylindrical objects, moving objects, natural features, and/or structural features. Additionally, the data filter 206 can work in conjunction with the metadata analysis component 208 to associate such recognized objects with metadata and/or automatically write metadata corresponding to features of the recognized objects. Such features may include, for example, a path of a moving object, a luminosity of one or more portions or objects of the scene content 202, a spatial and/or temporal arrangement of the one or more recognized objects relative to other objects in the scene content 202, and/or an audio feature over at least a portion of the scene content 202. Thus, metadata of the scene content 204 can correspond to these various aspects and characteristics which, herein, may be collectively or individually referred to as "elements" of the scene content and/or data content.

The metadata analysis component 208 receives an output from the data filter 206, which is comprised of the filtered scene content. The filtered scene content includes parsed or segregated elements recognized by the data filter 206 for metadata analysis and/or writing. The metadata analysis component 208 then provides metadata for each recognized element, or each aspect of such, and then output this content metadata 212 to a metadata store 220. As discussed above, such content metadata 212 can describe (i) a recognized element or characteristic of the recognized object, such as a defined path of the recognized object in motion (222), (ii) define a luminosity or other visual characteristic of one or more visual elements or objects of the scene content 202 (224), (iii) designate a spatial and/or temporal arrangement of the one or more recognized objects relative to other objects in the scene content 202, and/or (iv) tag an audio feature over at least a portion of the scene content 202 (226).

As an addition or alternative, a recognized object in the scene content 202 can output data that can be sensed or otherwise inputted into the data capture component 204. In such variations, the recognized object can correspond to a remotely operated device including various sensors and a wireless communication port to transmit characteristics of the device to the user's computing device. These characteristics may include one or more of the device's location, orientation, velocity and/or acceleration, heading, temperature, power level, error features, and the like. Furthermore, these characteristics can be associated with metadata created by the metadata analysis component 208. These characteristics can further be associated with customized or standard augmented reality (AR) elements 242 stored in an AR library 240 to be ultimately utilized for outputting augmented content 278.

The metadata store 220 can be included as a memory resource on the computing device 100. Alternatively, the metadata store 220 can be an external server that associates content metadata 212 with individual associated data content stored in the content storage 250. For example, a user may have an account with an external source associated with an application executable on the user's computing device 100. The external source may associate and/or tag content metadata 212 corresponding to specified data content 214 or a specific visual and/or audio recording from the user and stored in the content storage 250. Furthermore, the content metadata 212 for specified data content 214 can be synchronized to the data content 214 such that post-processing of the content metadata 212 can temporally correlate to the specified data content 214.

In variations of the system 200, content storage 250 and metadata storage 220 can comprise the same memory resource. In such variations, the data content 214 and the content metadata 212 can be kept separate via a variety of conventional methods. Alternatively, the data content 214 and the content metadata 212 may not be parsed by the visual component 210 until after the data content 214 is stored and the user executes a program or application to edit and/or augment one or more elements of the data content 214. As such, the visual component 210 can have an input from the memory resources storing the data content 214. Furthermore, an application resource, such as a metadata processor 230 or augmented reality (AR) generator 260, can be provided to parse data content 214/content metadata 212 for augmentation by the user. For example, once the content metadata 212 is extracted from the data content 214, any number of AR elements 242 can be provided to allow the user to augment the data content 214.

The system 200 can allow for real-time augmentation of the data content 214. In such variations, a user interface 270 can be provided on the display of the user's computing device to provide a direct feed of the real-time data content 214 corresponding directly to the scene content 202. The user interface 270 can include features such as a meta-tool 272, a network interface 274, and a content render component 276. The user can utilize the meta-tool 272 in order to select AR elements 244 for real-time augmentation of the data content 214. For example, the visual component 210 can be configured to dynamically track a recognized object during the capturing of the scene content 202. The resulting real-time data content 214 and corresponding content metadata 212 for the scene content 202 provides for dynamic augmentation of the recognized object. In such examples, the user can provide user inputs 216 into the meta-tool 272 in order to activate an AR generator 260 to generate one or more augmented elements to be superimposed or otherwise implemented on the recognized object.

The meta-tool 272 can be provided on the user interface 270 to enable the user to ultimately select, in real-time or post-capture, AR elements 242 to enhance, replace, or otherwise augment real-word objects and elements of the data content 214. In variations, the meta-tool 272 provides features allowing the user to select from a variety of options for augmentation of the data content 214. For example, the meta-tool 272 can allow the user to make selections 246 of any number of individual virtual characters to represent the recognized object. These virtual characters may include anything from a simple superimposed reference feature highlighting the recognized object, to an illustrated character or modified photograph that may include features representing or demonstrating any number of characteristics of the recognized object. For example, metadata corresponding to the path and/or velocity of the recognized object can allow for the virtual character to be superimposed over the recognized object, or even multiple recognized objects, throughout a duration of the data content 214.

Additionally, other features can be provided by the meta-tool 272 to augment the data content 214. These features may include the addition of visual special effects (e.g., modification of lighting or changing the weather conditions), the addition of a variety of audio elements (e.g., adding a laugh track, music, or sound effects), etc. Thus, each feature can execute the AR generator 260 to provide the desired AR elements 244 for augmentation of the data content 214. For real-time applications, the real-time data content 214 can be augmented in the above-manner to produce a real-time augmented output 278, which can be displayed on the user interface 270, streamed to any number of sites the internet 280 (e.g., social media sites 282), and/or shared via an application network 284 specific to an executed application on the computing device for augmenting the data content 214. For the latter, the user interface 270 can provide an application interface feature 274 to share the user-created augmented output 278 over the application network 284.

Additionally or as an alternative, the system 200 can provide for augmentation of previously captured data content 252 stored in the content storage 250. In such variations, the user can load the stored data content 252 and use the meta-tool 272 provided on the user interface 270 to augment the stored data content 252 in the manner described above. The user interface 270 can further provide a content render feature 276 to present the augmented output 278 on the display of the computing device. Additionally, the augmented output 278 can be shared on a variety of websites or otherwise uploaded to the internet. Further still, the augmented output 278 can be shared over the application network 284 as described above—where a web application specific to the augmentation of the data content 252 can provide for a feature to do so (e.g., an interactive graphic).

In variations of the system 200, the metadata store 220 and the AR library 240 can be inextricably linked, such that metadata elements parsed and recognized by the visual component 210 can be immediately associated with AR elements 242 stored in the AR library 240. In such variations, a metadata processor 230 can be included to perform the associations to provide a selectable list of AR elements 242 for the user to choose from in augmenting the data content 252. The metadata processor 230 can execute instructions to recognize various types of content metadata 212 associated with the data content 252 such as object 222, visual 224, and/or audio 226 metadata to allow for the association of the content metadata 212 with specified AR elements 242.

Alternatively, the association between various types of content metadata 212 and specified AR elements 242 can be performed by the AR generator 260. As such, the metadata processor 230 and the AR generator 260, as shown in FIG. 2, can be the same component in the system 200. In such variations, the user can make selections 246 using the meta-tool 272, which can then cause the AR generator 260 to pull the pertinent AR elements 244 from the AR library 240. Furthermore, the AR generator 260 can directly associate each element of the content metadata 212 from the data content 252 with an appropriate list of available AR elements 242, and provide a catalog comprised of lists of available AR elements 242 from which the user can select to produce the augmented output 278.

One or more components of FIG. 2 can be combined with one or more other components in order to achieve the overall objective of enabling the user to augment data content in real-time or post-capture, and shared such augmented content over the web. Furthermore, one or more components of FIG. 2 can be activated or configured to execute programmatic instructions in response to the execution of an application on the user's computing device specific to augmentation of the data content. Such an application can further be specific to controlling a recognized object, such as a remotely operated self-propelled device. Furthermore, the application can combine features of controlling the self-propelled device, providing AR functions to augment video content including the self-propelled device, and/or sharing the video content or augmented video content over social media or an application network specific to the application.

Methodology

Figure 3:
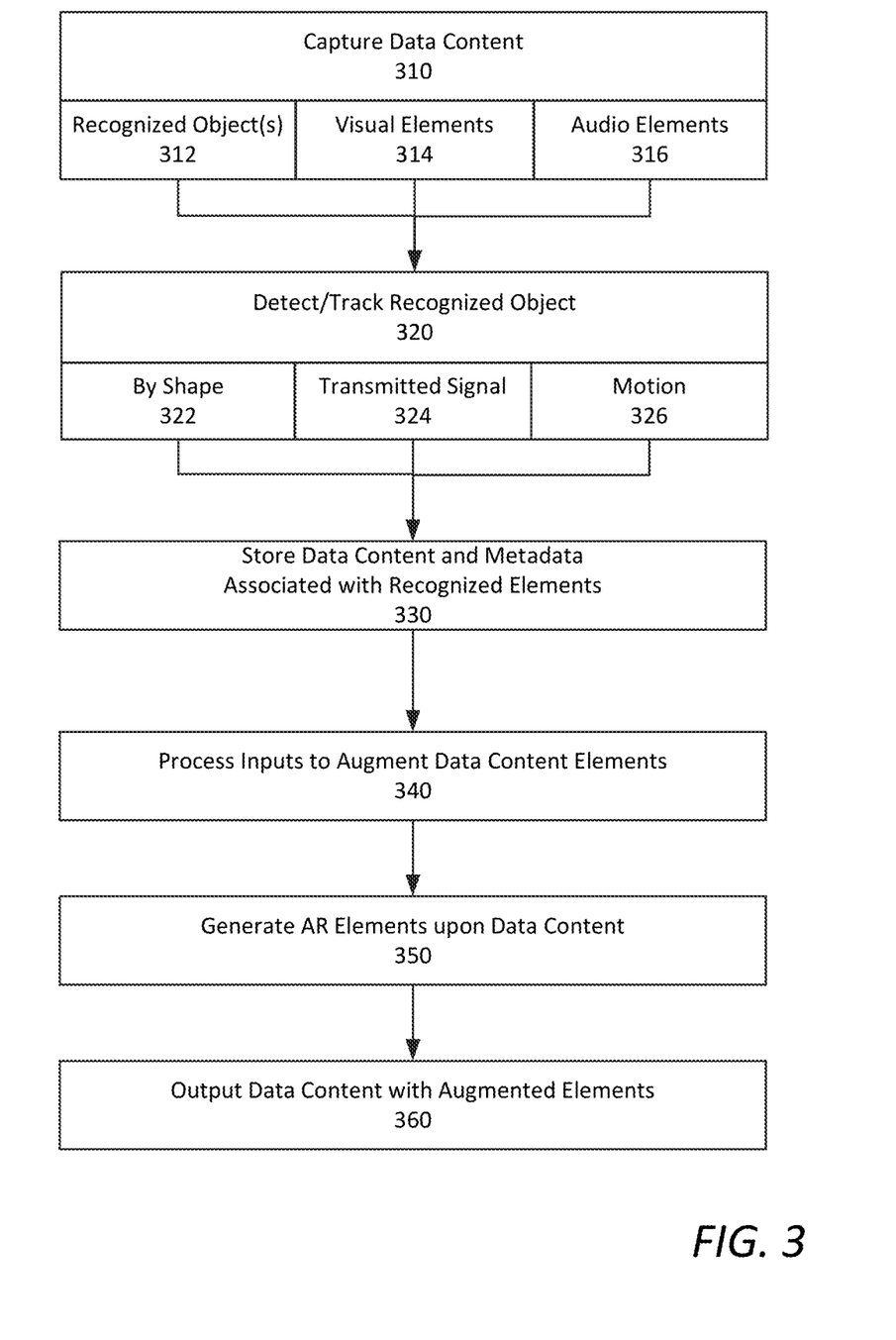
FIG. 3 in an example method of enabling augmentation of data content.

FIG. 3 is an example method of enabling augmentation of data content. Examples and variations of the method in FIG. 3 may be implemented via the system 200 of FIG. 2, and furthermore, in describing examples and variations of the method illustrated in FIG. 3, reference may be made to various reference characters associated with components of FIG. 2. Referring to FIG. 3, a data capture component 204 can capture or otherwise receive data content (310). Such data content can correspond to a scene or an observed environment including one or more recognized objects 312, and can further include various visual elements 314 and audio elements 316 that can later be augmented by a user.

A visual component 210 can filter and parse the data content and output content metadata 212. The visual component 210 can further be configured to recognize and track objects and elements in the data content (320), the information of which may be included in the content metadata 212. Such recognized objects can include, for example, a remotely operated self-propelled device with a distinctive shape and/or one or more distinct characteristics. Recognized elements can include various visual and audio elements of the captured content. The visual component 210 can include a metadata analysis component 208 to parse and/or create content metadata 212 associated with the recognized elements of the data content.

As an addition or alternative, the recognized object can correspond to a remotely operated device that includes various sensors and a wireless communication port to transmit, or otherwise send out a beacon containing one or more of the object's characteristics to the user's computing device. Thus, the method can include detecting transmissions 324 from the recognized object, and tracking the object and/or processing metadata of the object accordingly. These transmissions 324 can include characteristics of the object that may include one or more of the recognized object's location, orientation, velocity and/or acceleration, heading, temperature, power level, error features, and the like. Furthermore, these characteristics can be associated with metadata created by the metadata analysis component 208.

As an additional or alternative, the recognized object can be detected and tracked due to its distinctive shape (322). In such variations, the recognized object may be spherical in shape, or may include any distinctive characteristics that distinguish the object from the observed scene. Programming logic may be included to detect such a distinctive shape, and track the object for the duration of the captured data content 214. Furthermore, the object may be tracked according to its motion (326). Such motion may be detected to be erratic or otherwise inconsistent with the observed scene, wherein detection logic may identify and track the object moving in such a manner.

The content metadata 212 can then be stored along with the data content (330). As discussed with respect to FIG. 2, the content metadata 212 and the data content 214 can be stored jointly or separately in one or more storage devices. For example, the data content 214 can be stored in a content storage device 250 that is distinct from a metadata store 220, which can store all the content metadata associated with the data content 214. However, the data content 214 and its metadata 212 can also remain associated, at least temporally, via various associative storage means.

A user is enabled to augment various elements of the data content. User inputs corresponding to augmentation of the data content may then be processed (340). The user can augment the data content in real-time or after the data content has been stored. In either variation, augmentation features can be provided on a user interface 270 to the user's computing device, allowing the user to select from a variety of AR elements 242 to augment the data content. The AR elements 242 can themselves be filtered according to content metadata 212 associated with the data content. Furthermore, an AR generator 260 can interpret the user's inputs 216 and/or selections 246 to provide pertinent AR elements 244.

Once the user inputs 216 are processed, the AR selections 246 are made, and the pertinent AR elements 244 are provided, the AR elements can be generated and inputted upon the data content (350). As discussed, the AR elements 244 can visually or audibly alter elements of the data content, including recognized objects, visual elements (e.g., a luminosity of at least a portion of the data content, weather conditions, etc.), and audio elements (e.g., inputting sound effects or a music track). Rendering the AR elements 244 upon the data content can be performed automatically in response to receiving the user inputs 216, or can be performed by way of a content render feature 276 on the user interface 270. For example, the user can provide various inputs 216 in order to edit and augment the data content, and may wish to preview one or more portions of the augmented content. The content render component 276 can be interactive to allow the user to render or edit one or more AR elements 244 into the data content and preview a portion or the whole of the augmented content.

In variations, the data content can be outputted with the augmented elements included (360). Outputting the augmented content can be performed dynamically (i.e., in the case of real-time data content augmentation), or post-capture (i.e., where stored data content may be loaded and augmented using user interface tools). As discussed with respect to FIG. 2, the outputted augmented content 278 can be displayed directly to the user via the user interface 270 or the display of the user's computing device. Additionally or alternatively, the augmented content 278 can be uploaded or streamed to the internet 280. In similar variations, the user interface can include a feature that allows the user to share the augmented content 278 over various site-based or web-application-based social media platforms. Similarly, the augmented output 278 can be shared through an application on the user's computing device specific to augmentation of the data content. As discussed, such an application can further be specific to controlling a recognized object in the data content, such as a remotely operated self-propelled device, and further can combine features of controlling the self-propelled device, providing AR functions to augment video content including the self-propelled device, and/or sharing the video content or augmented video content over social media or an application network specific to the application.

Figure 4A:
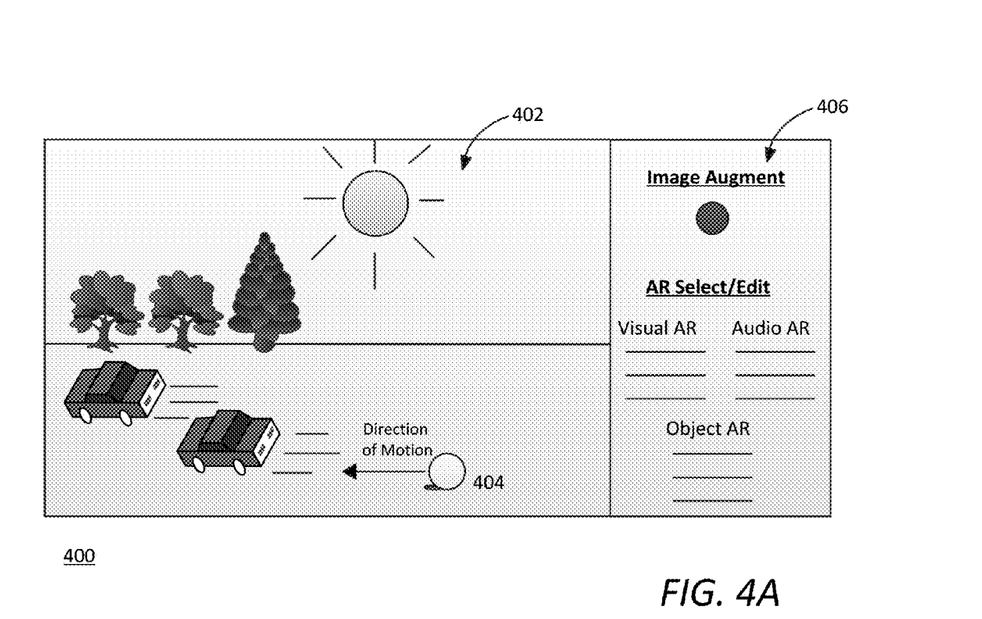
FIGS. 4A and 4B illustrate an example of captured data content and a respective example of outputted augmented content.
Figure 4B:
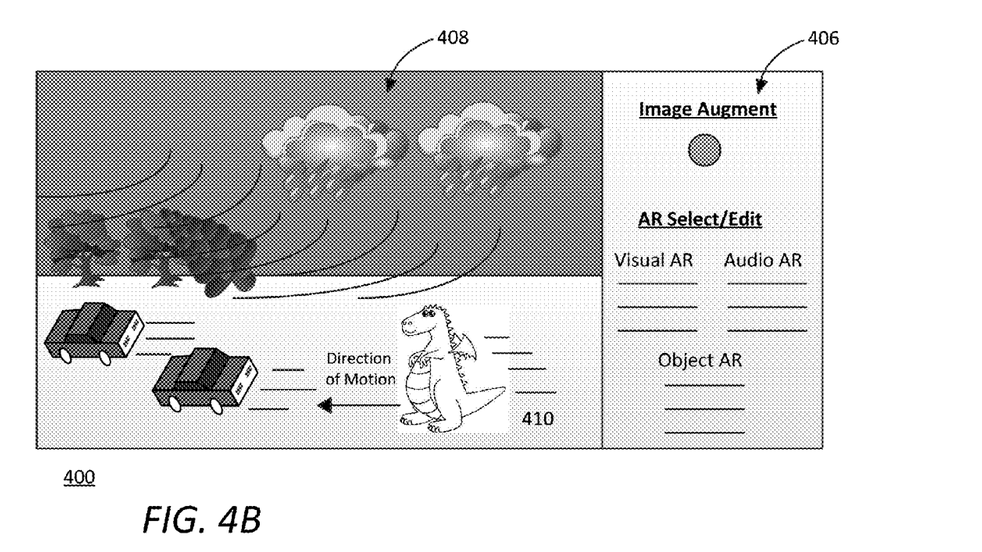

FIGS. 4A and 4B illustrate an example of captured data content and a respective example of outputted augmented content. The examples illustrated in FIGS. 4A and 4B may be performed using various components of the system 200 of FIG. 2 and various features of the method discussed with respect to FIG. 3. Referring to FIG. 4A, a scene 402 is captured with various visual elements and include a detectable object 404, such as a sphere or remotely operated device, and presented on a display 400 of the user's computing device. The elements of the scene 402 include, for example, a characteristic of the sky, the weather (e.g., sunny), a color of one or more portions of the scene, items of nature (e.g., trees), man-made objects (e.g., cars), the ground, the detectable or recognized object 404, various audio inputs, and the like. The object 404 can be stationary or in motion. For illustrative purposes, in FIG. 4A, the recognized object is shown with a direction of motion. However, for all intents and purposes, the recognized object can move erratically and/or in any manner with any path throughout the scene. Furthermore, the data capture component 204 capturing the scene 402 captures what amounts to a series of images or a video, which may include audio, of the scene 402. Still further, the data capture component 204 can also move, and metadata associated with the scene content can nevertheless be recorded and/or created despite the motions and changes of the elements within the scene, and the capturing component 204 itself.

The user's computing device can provide such data content on the display 400 as part of a preview of what is being detected and/or captured by the data capture component 204. Furthermore, a user interface 406 can be provided that includes various features to enable the user to augment data content of the scene 402. As such, one or more the various elements of the data content can be augmented to produce a variety of augmented content based on the data content.

An example of such augmented content is shown in FIG. 4B. As shown in FIG. 4B various elements of the original data content corresponding to the scene 402 have been augmented to produce the augmented content 408 shown in FIG. 4B. For example, elements such as the luminosity of the sky, the weather, the orientation of certain recognized objects (e.g., the trees), and the recognized object 404 (e.g., a remotely operated device), have been altered and/or augmented to create and output the augmented content 408. Of note, the recognized object 404 has been augmented by the user to be represented by the virtual character 410 shown in FIG. 4B. Since metadata corresponding to the path, velocity, acceleration, and/or other characteristics of the recognized object have been stored and/or processed in real-time, the virtual character 410 can dynamically represent the recognized object throughout the entire duration of the data content. Alternatively, the virtual character 410 representing the recognized object can be configured to change at any time over the duration of the data content. Accordingly, augmentation of one or more elements of the data content shown in the original scene 402 of FIG. 4A can be performed in real-time.

Alternatively, changing of the virtual character 410 can be performed via a trigger on the user interface 406, or otherwise be configurable during augmentation of the data content. As such, augmented content 408 can correspond to previously recorded data content corresponding to the scene 402. The user interface 406 can enable the user to augment any number of elements of the data content (and spend as much time as desired) in order to produce the augmented content 408. Various characteristics of the recognized object 404 corresponding to sensors that can be included in the object (e.g., the object's location, orientation, velocity and/or acceleration, heading, temperature, power level, error features, etc.) may be enhanced or further represented and/or demonstrated by the virtual character 410. For example, the element of acceleration corresponding to the motion of the recognized device 404 is shown to be demonstrated by the virtual character 410. However, any of the above-elements can be demonstrated through color change, illuminating outputs (e.g., blinking, dimming, brightening, etc.), and/or variations in size and/or shape of the virtual character 410. Furthermore, various sound effects can be inputted by the user to demonstrate or correlate to other elements of the data content.

Each of the images of the data content can be processed to detect the recognized object 404, and the detected object 404 can be processed as input so that, on the display device of the computing device, the displayed character 410 also moves accordingly. In some variations, the images being rendered can be dynamically adjusted. For example, the graphic image of the virtual character 410 can be dynamically changed to a graphic image of a different virtual character in response to a trigger, such as a user input or the recognized object being moved to a particular location or next to another object of interest.

As an addition or alternative, a computing device, such as shown in FIG. 1, can detect multiple objects in images and track the positions and/or movements of the multiple objects. In some embodiments, a capturing component and/or the computing device that processes the images to detect one or more recognizable objects can be separate and distinct from a computing device that controls the movement of the recognized object, which may correspond to a spherical self-propelled device. Still further, in one variation, content (e.g., a superimposed virtual character) that is rendered based on the detected and tracked object on a computing device can be dynamically altered based on one or more triggers or inputs provided by another computing device.

For example, multiple users can engage with one another in a gaming environment, where a first user controls the movement of the object of interest using a first computing device, while a second user and a third user track the recognized object and render content on their respective computing devices. A fourth user can use a fourth computing device to control what content is being displayed on the second and third users' devices (e.g., dynamically adjust what graphic image is displayed in place of the detected object). For example, in one implementation, the second user can track the recognized object and view rendered content that is different than content that is rendered on a computing device of the third user (e.g., based on the fourth user controlling what content is to be displayed to individual users). Furthermore, the computing devices can communicate with each other via a wireless communication protocol, such as Bluetooth or Wi-Fi.

CONCLUSION

It is contemplated for embodiments described herein to extend to individual elements and concepts described herein, independently of other concepts, ideas or system, as well as for embodiments to include combinations of elements recited anywhere in this application. Although embodiments are described in detail herein with reference to the accompanying drawings, it is to be understood that this disclosure is not limited to those precise embodiments. As such, many modifications and variations will be apparent to practitioners skilled in this art. Accordingly, it is intended that the scope of the invention be defined by the following claims and their equivalents. Furthermore, it is contemplated that a particular feature described either individually or as part of an embodiment can be combined with other individually described features, or parts of other embodiments, even if the other features and embodiments make no mentioned of the particular feature. Thus, the absence of describing combinations should not preclude the inventor from claiming rights to such combinations.

One or more embodiments described herein provide that methods, techniques and actions performed by a computing device are performed programmatically, or as a computer-implemented method. Programmatically means through the use of code, or computer-executable instructions. A programmatically performed step may or may not be automatic.

One or more embodiments described herein may be implemented using programmatic modules or components. A programmatic module or component may include a program, a subroutine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through the use of instructions that are executable by one or more processors. These instructions may be carried on a non-transitory computer-readable medium. Machines shown or described with FIGS below provide examples of processing resources and computer-readable mediums on which instructions for implementing embodiments can be carried and/or executed. In particular, the numerous machines shown with embodiments include processor(s) and various forms of memory for holding data and instructions. Examples of computer-readable mediums include permanent memory storage devices, such as hard drives on personal computers or servers. Other examples of computer storage mediums include portable storage units (such as CD or DVD units), flash memory (such as carried on many cell phones and tablets)), and magnetic memory. Computers, terminals, network enabled devices (e.g., mobile devices such as cell phones) are all examples of machines and devices that utilize processors, memory and instructions stored on computer-readable mediums. Additionally, embodiments may be implemented in the form of computer-programs, or a computer usable carrier medium capable of carrying such a program.

Although illustrative embodiments have been described in detail herein with reference to the accompanying drawings, variations to specific embodiments and details are encompassed by this disclosure. It is intended that the scope of the invention is defined by the following claims and their equivalents. Furthermore, it is contemplated that a particular feature described, either individually or as part of an embodiment, can be combined with other individually described features, or parts of other embodiments. Thus, absence of describing combinations should not preclude the inventor(s) from claiming rights to such combinations.

While certain embodiments have been described above, it will be understood that the embodiments described are by way of example only. Accordingly, the disclosure should not be limited based on the described embodiments. Rather, this disclosure should only be limited in light of the claims that follow when taken in conjunction with the above description and accompanying drawings.

What is claimed is:

1. A mobile computing device comprising:
   a touch-sensitive display;
   one or more processors; and
   one or more memory resources storing instructions that, when executed by the one or more processors, cause the mobile computing device to:
   receive video content from an image capturing device;
   detect and track a self-propelled device in the video content;
   display, on the touch-sensitive display, a plurality of augmented reality elements selectable to augment the self-propelled device;
   receive a user selection of one of the plurality of augmented reality elements to augment the self-propelled device; and
   augment the self-propelled device in the video content by superimposing the selected augmented reality element over the self-propelled device as the self-propelled device moves.

2. The mobile computing device of claim 1, wherein the executed instructions further cause the mobile computing device to:
   receive real-time data from the self-propelled device; and
   provide an augmentation tool on the touch-sensitive display to enable a user of the mobile computing device to augment the self-propelled device in real time.

3. The mobile computing device of claim 2, wherein the real-time data received from the self-propelled device comprises one or more of orientation data, temperature data, or power level data of the self-propelled device.

4. The mobile computing device of claim 3, wherein the selected augmented reality element for the self-propelled device visually represents the real-time data received from the self-propelled device.

5. The mobile computing device of claim 1, wherein the executed instructions further cause the mobile computing device to:
   store the video content to enable a user of the mobile computing device to augment the stored video content after capture.

6. The mobile computing device of claim 1, wherein the executed instructions further cause the mobile computing device to:
   provide an interface feature on the touch-sensitive display to enable a user of the mobile computing device to share the video content, including the augmented self-propelled device, with a number of other users.

7. The mobile computing device of claim 1, wherein the executed instructions further cause the mobile computing device to:
   identify a plurality of elements in the video content;
   generate content metadata corresponding to each of the plurality of elements;
   using the content metadata, associate each of the plurality of elements with a number of corresponding augmented reality elements;
   provide an augmentation tool on the touch-sensitive display to enable a user to select a respective augmented reality element for each of the plurality of elements; and
   augment the video content to include the selected respective augmented element for each of the plurality of elements.

8. A non-transitory computer-readable medium storing instructions that, when executed by one or more processors of a mobile computing device, cause the mobile computing device to:
   receive video content from an image capturing device;
   detect and track a self-propelled device in the video content;
   display, on a touch-sensitive display, a plurality of augmented reality elements selectable to augment the self-propelled device;
   receive a user selection of one of the plurality of augmented reality elements to augment the self-propelled device; and augment the self-propelled device in the video content by superimposing the selected augmented reality element over the self-propelled device as the self-propelled device moves.

9. The non-transitory computer-readable medium of claim 8, wherein the executed instructions further cause the mobile computing device to:
receive real-time data from the self-propelled device; and
provide an augmentation tool on the touch-sensitive display to enable a user of the mobile computing device to augment the self-propelled device in real time.

10. The non-transitory computer-readable medium of claim 9, wherein the real-time data received from the self-propelled device comprises one or more of orientation data, temperature data, or power level data of the self-propelled device.

11. The non-transitory computer-readable medium of claim 10, wherein the selected augmented reality element for the self-propelled device visually represents the real-time data received from the self-propelled device.

12. The non-transitory computer-readable medium of claim 8, wherein the executed instructions further cause the mobile computing device to:
store the video content to enable a user of the mobile computing device to augment the stored video content after capture.

13. The non-transitory computer-readable medium of claim 8, wherein the executed instructions further cause the mobile computing device to:
provide an interface feature on the touch-sensitive display to enable a user of the mobile computing device to share the video content, including the augmented self-propelled device, with a number of other users.

14. The non-transitory computer-readable medium of claim 8, wherein the executed instructions further cause the mobile computing device to:
identify a plurality of elements in the video content;
generate content metadata corresponding to each of the plurality of elements;
using the content metadata, associate each of the plurality of elements with a number of corresponding augmented reality elements;
provide an augmentation tool on the touch-sensitive display to enable a user to select a respective augmented reality element for each of the plurality of elements; and
augment the video content to include the selected respective augmented element for each of the plurality of elements.

15. A computer-implemented method of augmenting video content, the method being performed by one or more processors of a mobile computing device and comprising:
receiving video content from an image capturing device;
detecting and tracking a self-propelled device in the video content;
displaying, on a touch-sensitive display, a plurality of augmented reality elements selectable to augment the self-propelled device;
receiving a user selection of one of the plurality of augmented reality elements to augment the self-propelled device; and
augmenting the self-propelled device in the video content by superimposing the selected augmented reality element over the self-propelled device as the self-propelled device moves.

16. The method of claim 15 further comprising:
receiving real-time data from the self-propelled device; and
providing an augmentation tool on the touch-sensitive display to enable a user of the mobile computing device to augment the self-propelled device in real time.

17. The method of claim 16, wherein the real-time data received from the self-propelled device comprises one or more of orientation data, temperature data, or power level data of the self-propelled device.

18. The method of claim 17, wherein the selected augmented reality element for the self-propelled device visually represents the real-time data received from the self-propelled device.

19. The method of claim 15, further comprising:
providing an interface feature on the touch-sensitive display to enable a user of the mobile computing device to share the video content, including the augmented self-propelled device, with a number of other users.

20. The method of claim 15, further comprising:
identifying a plurality of elements in the video content;
generating content metadata corresponding to each of the plurality of elements;
using the content metadata, associating each of the plurality of elements with a number of corresponding augmented reality elements;
providing an augmentation tool on the touch-sensitive display to enable a user to select a respective augmented reality element for each of the plurality of elements; and
augmenting the video content to include the selected respective augmented element for each of the plurality of elements.

* * * * *